July 7, 1964   V. J. STEPHENSON ETAL   3,140,114
COMBINED CHAIR AND BED FOR VEHICLES
Filed Aug. 19, 1963   3 Sheets-Sheet 1

INVENTORS:
VERL J. STEPHENSON
MARTIN NOVODOR
BY
W. J. Gribble
ATTORNEY

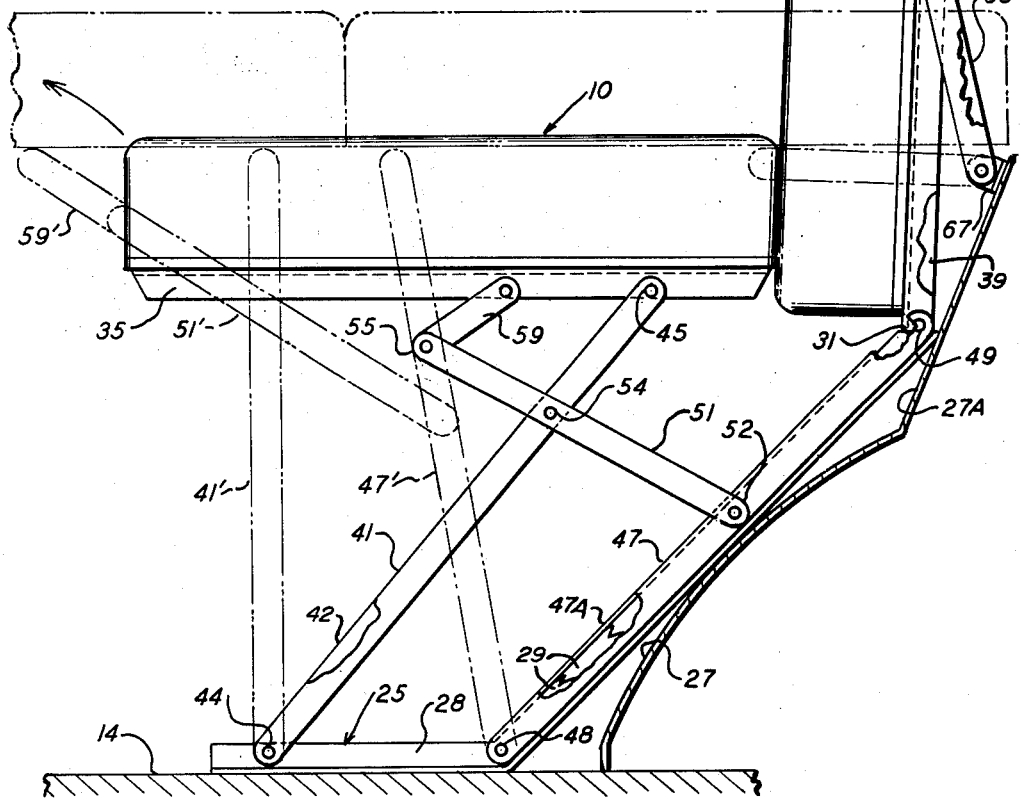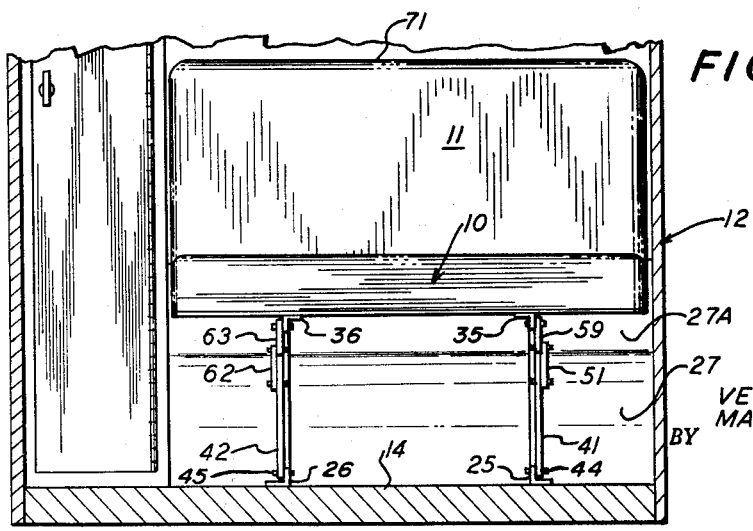

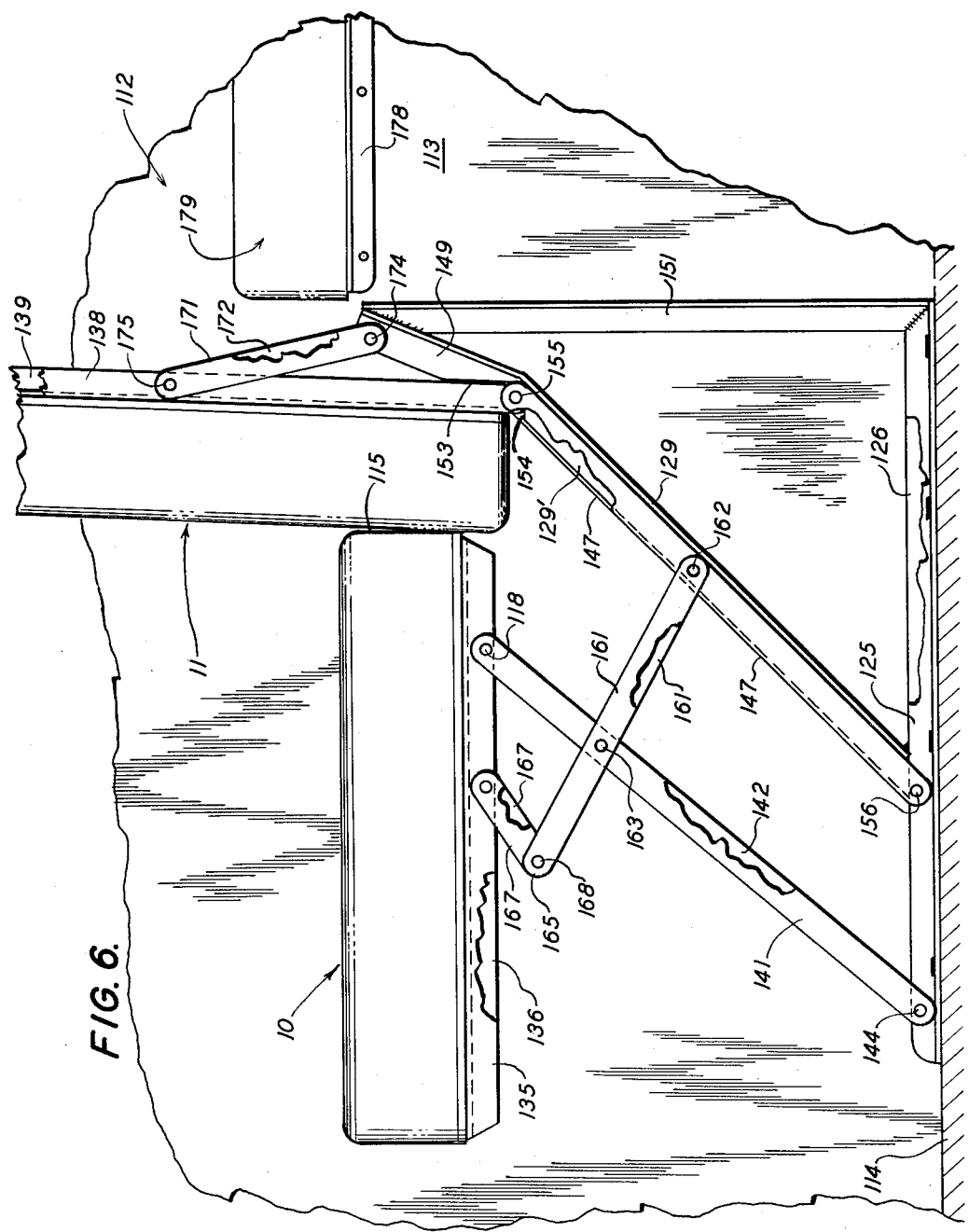

United States Patent Office 3,140,114
Patented July 7, 1964

---

3,140,114
COMBINED CHAIR AND BED FOR VEHICLES
Verl J. Stephenson, La Canada, and Martin Novodor, Los Angeles, Calif., assignors to Benjamin C. Blankenship
Filed Aug. 19, 1963, Ser. No. 303,013
4 Claims. (Cl. 296—69)

The invention relates to combination seats and beds for vehicles and more particularly to such convertible seats and beds for use in vehicles having storage space within the passenger compartment of the vehicle.

Many vehicles now being sold to private individuals have space within the passenger compartment that may be converted to uses other than seating passengers. In these vehicles this space may be used for storage of travel gear or outdoor camping gear, for instance. Some of these vehicles have a rearwardly suspended motor which projects into the passenger enclosure. Conventionally the motor is enclosed by a solid shell or housing which is itself capable of bearing some weight. Such vehicles having seats which can be converted for sleeping facility are most desirable. These vehicles are used in place of auto trailers and afford comfortable quarters only because most of the enclosed space is efficiently used. Therefore, the suspending mechanism whereby such combined seats and beds can be oriented either as a seat or a bed must be an efficient mechanism that occupies little of the usable space within the enclosed compartment.

We have invented a combination seat and bed which can be quickly converted from a seat to a bed and vice versa, and which has support apparatus which does not unduly interfere with the utilization of space not occupied by the seat and/or bed cushions. The invention contemplates a combination seat and bed for use in a vehicle having a floor and raised support means, in which the seat and bed comprise a front cushion, a back cushion and means supporting the front cushion in a movable horizontal position. The invention includes further means adapting the front cushion for displacement from the forward to a rearward position and means orienting the back cushion with respect to the front cushion so as to maintain selectively said back cushion in alterable coplanar relationship to the front cushion with the back cushion being supported upon said means. The displacement means and the orienting means are such that displacement of the front cushion to a more rearward position operates to re-orient the back cushion into substantially vertical position adjacent the front cushion so as to form a seat in which the horizontal attitude of the front cushion is not substantially altered.

In the preferred embodiment the displacement means for the front cushion comprises an upwardly extending front support pivoted with respect to the floor so as to swing in a front to rear plane and hinged to the front cushion. A rear support pivotally supports the forward edge of the back cushion, and is pivotally secured with respect to the floor. A horizontal lever is pivotally attached to the middle of the rear support and extends forwardly beyond the front support and is pivotally affixed thereto. A short link arm is connected to the extending end of the horizontal lever and to a median portion of the underside of the front cushion. A tie arm preferably fixed to the raised motor deck or other support means in pivotal fashion is fixed in hinged fashion to a median portion of the underside of the back cushion. The tie arm functions to restrain the forward motion of the front and back cushions in bed orientation and locates the back cushion in its vertical position in the seat orientation.

If the seat-bed combination is extensive in its transverse dimension across the vehicle, it may be desirable to duplicate the front and rear supports and the horizontal lever, link arm and tie arms.

The combination of seat cushions and supports set forth above occupies very little space within the enclosed portion of the vehicle, adapts to ready re-orientation of the cushions between seat and bed positions and is readily fabricated of present commercial materials.

These and other advantages of the invention are apparent in the following detailed description and drawing in which:

FIG. 3 is a front elevation taken along line 3—3 of FIG. 2;

FIG. 4 is an enlarged schematic elevation of the convertible seat and bed of the invention;

FIG. 6 is a side elevation of a further alternate embodiment.

Figure 1:
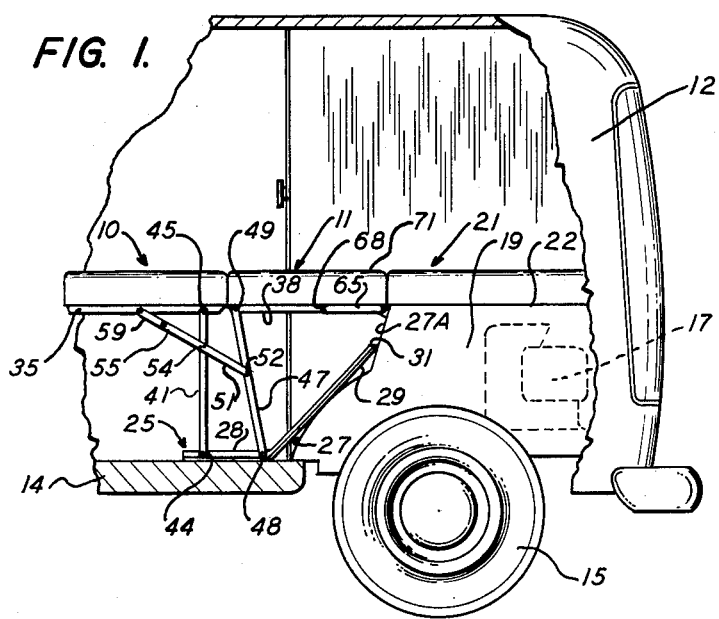
FIG. 1 is a fragmentary side elevation, partly broken away, of a vehicle having a convertible seat and bed in accordance with the invention, oriented in bed position.
Figure 2:
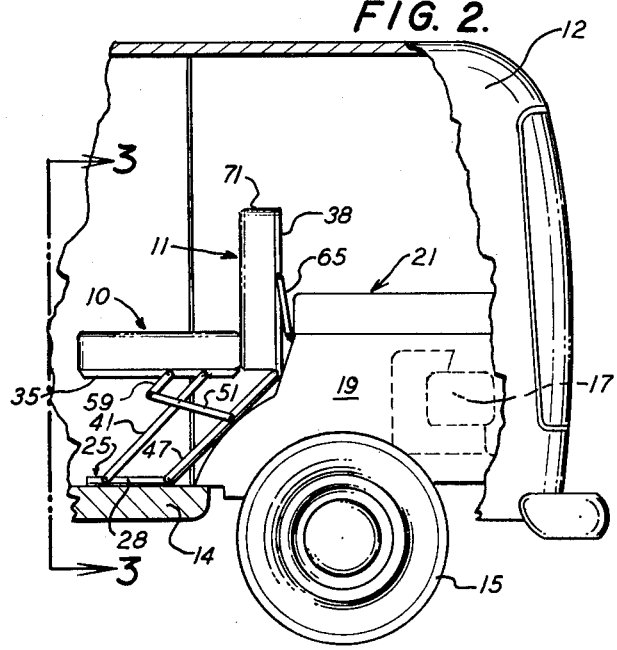
FIG. 2 is an elevational view similar to FIG. 1 and showing the cushions of the invention oriented in seat position.

In FIGS. 1 and 2 a front cushion 10 and a back cushion 11 reside in coplanar horizontal relationship within a passenger vehicle 12. The vehicle has a floor 14, rear wheels 15, and a motor 17 shown in dotted lines. A motor and wheel housing 19 supports an optional third cushion 21 which rests upon an upper deck surface 22.

As can be seen from FIG. 3, a pair of floor mounting brackets 25, 26 are fixed by suitable means to floor 14 of the vehicle. Immediately in front of a sloping front wall 27 of the motor housing, each mounting bracket has a floor strip 28 and a rising diagonal strip 29. Diagonal strip 29 of each bracket may be secured at its top 31 to an upper sloping wall 27A of the motor housing.

Front cushion 10 has a pair of spaced longitudinal angle mounts 35, 36 fixed to its underside. Second angle mounts 38, 39 are similarly secured to the bottom surface of back cushion 11. A pair of upwardly extending front braces 41, 42 support front cushion 10 in its horizontal orientation, as shown in FIG. 1. Each brace, 41, 42 is secured to a floor mounting bracket and to the angle mount, respectively, by pivot pins 44, 45. An upwardly extending rear brace 47, 47A is secured by pivot pins 48, 49 to each floor mounting bracket and to an angle mount 38, 39 of the back cushion, respectively. While the preferred means of fabrication includes floor mounting brackets 25, 26, the front and rear braces may be hingedly fixed directly to the floor of the vehicle, if desired. However, use of the mounting brackets simplifies accurate positioning within the vehicle and precise relative location of the pivot pins of the braces.

A horizontal lever 51 has an end 52 fixed in pivoted fashion at an intermediate point to rear brace 47. A pivot pin 54 positions the horizontal lever with respect to front brace 41 in pivotal fashion. An end 55 of the lever extends forwardly beyond brace 41. Ends of a short link 59 are pivotally fixed to end 55 of the lever and angle mount 35 of the front cushion, respectively.

Similarly, horizontal lever 62 and short link 63 are secured in like fashion to front and rear braces 42, 47A and to angle mount 36.

A pair of tie arms 65, 66 are pivotally secured at one end to the deck of the motor housing 19 at transversely spaced points by mounts 67 (FIG. 4). The opposite end of each tie arm is fixed by a pivot pin 68 to angle mounts 38, 39, respectively. As mentioned, the tie arms preclude extreme forward motion of the front and back cushions while in the bed orientation.

In FIG. 2 the bed shown in FIG. 1 has been converted into a seat by proper manipulation of the front cushion. An upward lift on the upper edge of cushion 10 coincident with a rearward thrust of that cushion causes the cushions to move rearwardly upon arcs centered at the lower pivot pins 44, 48 of front braces 41, 42 and rear braces 47, 47A. The rear edge 71 of back cushion 11 rises in a motion determined in part by the arcuate length of tie arms 65, 66. Rearward motion continues until the rear braces 47, 47A rest against the slanting surface of floor mounting bracket diagonals 29. As shown in FIG. 2, the corner edge of cushion 11 nearest pivot pins 49 rests upon top 31 of the diagonals, giving additional stability to the cushions in seat orientation.

As shown in more detail in FIG. 4, the front and rear braces approach parallel relationship to diagonal 29. Short links 59, 63, instead of extending away from the front braces, assume a position in which their upper end project rearwardly in a position roughly paralleling front braces 41, 42.

Loads imposed upon cushion 10 are supported upon front braces 41, 42. The braces cannot move downwardly because of the fixed position of levers 51, 62 due to their base upon diagonal 29. Similarly, ends 55 of the levers cannot be displaced downwardly because of pivot pins 54 securing them to front braces 41, 42, respectively. Therefore short links 59, 63 have no freedom of movement under loads imposed downwardly upon cushion 10. The front cushion is therefore able to bear a passenger's weight without moving from its horizontal position.

Back cushion 11 rests upon stops 31 of diagonal braces 29, its lower end restrained from forward motion by overlapping cushion 10. Tie arms 65, 66 preclude further rearward swinging of cushion 11 about its pivotal connection to rear brace 47. Thus the two cushions are securely held in seat orientation.

A simple forward lifting motion upon cushion 10 moves that cushion forward about pivot pins 44 and 55, freeing cushion 11 from its bound position so that the induced forward travel of braces 47, 47A imparts a beveling movement to back cushion 11 until the cushions stabilize in the orientation shown in FIG. 1. The front and back cushions are aligned in a single plane with the optional cushion 21.

Figure 5:
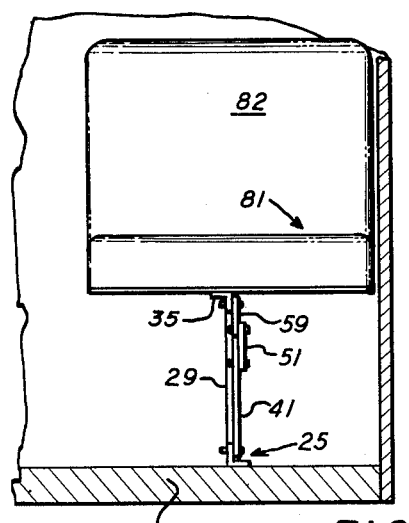
FIG. 5 is a front elevation of an alternate embodiment of the invention with a single pair of supports.

In the position shown in FIG. 1, the joining edges of cushions 10 and 11 are supported by the braces 41, 42, 47, 47A. As set forth heretofore, if the transverse extent of the cushions is small, as is the extent of cushions 81, 82 in FIG. 5, a single pair of braces 41, 47 may be centrally located beneath the cushions, eliminating the second pair of vertical braces. However, in the conventional vehicle, the size of the cushions is such that pairs of front and rear braces are preferred.

Within adjacent edges of the cushions supported by the substantially vertical front and rear braces the resistance to cushion tilt is slight by the combination of horizontal lever 51 and link 55 of the front cushion and by tie arms 65, 66 for the back cushion. Moment about pivots 45 of the front cushion is effectively resisted by short links 59, which are put in compression between the mounting angle of the cushion and the horizontal lever. The back cushion is supported directly upon the tie arms with the resulting tension thereupon opposed by the pivot fastening to the deck member of the motor housing.

FIG. 6 illustrates a further alternate embodiment of the invention particularly suited to vehicles in the class concerned that do not have a motor housing deck in the rear of the passenger compartment. The illustrated embodiment comprises a front cushion 10 and a back cushion 11 extending transversely of the passenger vehicle 112 from adjacent a side wall 113. In FIG. 6, the cushions are shown in seat orientation, that is, with the back cushion extending substantially vertically and in contact with a rear edge 115 of front cushion 10. The cushions have first angle mounts 135, 136 and second angle mounts 138, 139 fixed respectively to cushions 10 and 11. A pivot pin 118 secures each of a pair of upwardly extending front braces 141, 142 to a first angle mount of the front cushion. Each front brace extends downwardly and forwardly to one of a pair of floor mounting brackets 125, 126 fixed by suitable means to the vehicle floor 114, preferably near the rear of the passenger compartment. The front braces are pivotally secured to the floor brackets by pivot pins 144. A pair of diagonal strips 129 that are spaced transversely of the vehicle rise from the floor brackets and at their upper ends have an angle leg 149 secured at its top edge to a raised support brace 151. The two support braces 151 hold diagonal strips 129 in position. Other bracing (not shown) may add rigidity to the structure as needed.

Each leg 149 has a notch 153 to clear second angle mounts 138, 139 and to provide a stop 154 for the back cushion.

The back cushion rests against notches 153 and is in part controlled in its motion by upwardly extending rear braces 147, each secured at its top by a pivot pin 155 to the cushion 11 and at its bottom by a pivot pin 156 to the floor bracket. The rear braces may rest against the diagonal strips when the cushions are in seat orientation.

As in the previous embodiments, a horizontal lever 161 is secured by a pivot pin 162 to each vertical rear brace. The pin penetrates the rear brace at a point intermediate its length. The horizontal lever is secured to each front brace 141 by a pivot pin 163. The forward end 165 of each horizontal lever is pivotally secured to a link 167 by a pin 168. The end of each short link is secured to a fixed angle mount of the front cushion by a pivot pin 169.

As in the previously described embodiment, the relationship of the various braces and levers imposes a particular motion upon the front cushion so that its forward displacement from the position shown in FIG. 6 does not materially affect its horizontal attitude. The back cushion 11 reacts similarly to the back cushions of the previous embodiments because of the restraint imposed on its motion by tie arms 171, 172 that are each linked by pivot pins 174, 175 to the diagonal strips 129 and the second angle mounts 138, 139, respectively.

Each of opposed vertical side walls of the passenger compartment may have a shelf bracket 178 secured thereto to support an optional third cushion 179 at a height from the floor coinciding with the elevation of the cushions when they are displaced to bed position from the position in FIG. 6. The embodiment of FIG. 6, like those previously described, may be displaced from seat to bed positions and vice versa by manual manipulation or by a lever arrangement or by motorized components. It may be supported upon a single set of front and rear braces if its transverse dimension is small.

Therefore, the ingenious, yet uncomplicated pivoted brace-and-tie structure of our invention adequately supports the cushions in either seat or bed orientation and provides swift conversion between bed and seat usages. While the cushions may be converted from one position to another by direct force upon the cushions themselves, it is within the contemplation of the invention to provide means operating upon the braces or the links themselves to cause displacement of the cushions. Such means may be either hydraulically or electrically actuated or may include a simple leverage mechanism operable adjacent the braces. Further variations within the scope of the invention may occur to those skilled in the art. Therefore, we desire the invention to be measured by the appended claims rather than by the illustrative embodiments shown herein.

We claim:

1. A convertible seat and bed for use in a vehicle having a floor and a raised deck comprising a pair of parallel spaced rest bars, each rising from the floor and extending between the floor and deck, a pivoted first upwardly extending brace rising from the floor adjacent each rest bar, a pivoted second upwardly extending brace rising from the floor fixed at a point remote from each rest bar, a lever pivotally attached to each of the first and second braces and extending remotely from the deck beyond the second brace, said lever being attached to each of the first and second braces remote from the floor, a short link arm pivotally connected to the remote end of each lever, a front cushion pivotally mounted to each second brace near a midpoint of the cushion, the link arms from each lever being also pivotally fixed to the front cushion forwardly of the point at which said cushion is mounted to said second brace, a back cushion pivotally fixed near its front edge to each of the first upwardly extending braces at the top thereof and a tie arm extending from the raised deck to the back cushion, said tie arm being pivotally fixed at each of its respective ends to the raised deck and the back cushion, and a stop at the top of each rest bar adapted to seat the bottom of the rear cushion when the cushions are oriented to form a seat, said tie arm restraining forward motion of the cushions when said cushions are oriented in parallel relationship to form a bed.

2. A convertible seat and bed for use in a vehicle having a floor and raised support means comprising a pair of horizontal spaced mounting brackets fixed to the floor, parallel spaced rest bars, one rising from each bracket and extending between the floor and the raised support means, an upwardly extending brace rising from each bracket near the juncture of the bracket and the rest bar and pivotally fixed to the bracket, a second upwardly extending brace fixed to each bracket in pivotal fashion at a point remote from the juncture of the bracket and the rest bar, a lever pivotally attached to each of the first and second upwardly extending braces above the mounting bracket and extending remotely from the raised support means beyond the second brace, a short link arm pivotally connected to the remote end of the lever, a front cushion pivotally mounted to each second brace intermediate the front cushion, the link arm from each lever being pivotally fixed to a portion of the front cushion forward of the attachment of the second brace thereto, a back cushion pivotally fixed near its front edge to each of the first upwardly extending braces at the top thereof, and a tie arm pivotally fixed at one of its ends to the rest bar and at its other end to the back cushion, and a stop on each rest bar adapted to seat the bottom of the rear cushion when the cushions are oriented to form a seat, said tie arm restraining forward motion of the cushions when said cushions are oriented in parallel relationship to form a bed.

3. A convertble seat and bed for use in a vehicle having a floor and a raised deck comprising a longitudinal bracket fixed to the floor, a rest bar extending from an end of the bracket between the floor and the deck, a stop at the top of the rest bar, an upwardly extending rear brace pivotally secured to the bracket near the juncture of the bracket and the rest bar, a forward brace pivotally fixed to the bracket remote from the rest bar and rising upwardly therefrom, a lever pivoted at one end to the upwardly extending rear brace and extending therefrom forwardly and pivotally secured near its midpoint to the forward brace, said lever being pivoted to the rear brace at a point lower than the point at which it is secured to the front brace, a front cushion supported by the forward brace, said forward brace being pivotally attached to the bottom side of the front cushion, a link arm extending from the forward end of the lever to the bottom side of the front cushion, pivot pins securing one end of the link arm to the lever and the other end of the link arm to the front cushion, a back cushion, a pivot pin securing the back cushion to the top of the upwardly extending rear brace, a tie arm extending between the raised deck and the center of the back cushion bottom, pivot pins securing the tie arm to the raised deck and to the back cushion, said tie arm restraining forward motion of the cushions when said cushions are oriented horizontally in parallel relationship to form a bed and restricting the back cushion to a substantially vertical position when the front cushion and upwardly extending rear brace and forward brace are moved rearwardly to form a seat, the orientation relationship of the braces and the rest bar being such that in seat position the upwardly extending rear brace registers against the rest bar.

4. A convertible seat and bed for use in a vehicle having a floor and a raised support means and comprising a front cushion, a front upwardly extending brace supporting the front cushion in an alterable horizontal position, a back cushion, a rear upwardly extending brace attached to the back cushion, linking means attached to the front cushion and to the front and rear braces, means fixing each brace in pivotable relationship to the vehicle floor, means attached to the raised support means for limiting motion of the back cushion, said linking means being adapted to establish the horizontal attitude of the front cushion and to communicate front cushion displacement to the back cushion so as to move the back cushion between vertical and coplanar relationships to the front cushion.

References Cited in the file of this patent

UNITED STATES PATENTS

| | | |
|---|---|---|
| 1,759,942 | Grider | May 27, 1930 |
| 2,044,334 | Shrewsbury | June 16, 1936 |
| 2,314,864 | Bergstrom | Mar. 30, 1943 |
| 2,335,870 | Martin | Dec. 7, 1943 |
| 2,501,027 | Carmichael | Mar. 21, 1950 |
| 2,718,256 | Carte | Sept. 20, 1955 |